United States Patent
Lee

(10) Patent No.: US 8,050,214 B2
(45) Date of Patent: Nov. 1, 2011

(54) METHOD FOR ENTERING SILENT MODE AND MOBILE COMMUNICATION TERMINAL FOR THE SAME

(75) Inventor: Ki-Sung Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 799 days.

(21) Appl. No.: 11/710,863

(22) Filed: Feb. 26, 2007

(65) Prior Publication Data

US 2007/0243908 A1  Oct. 18, 2007

(30) Foreign Application Priority Data

Feb. 24, 2006  (KR) ........................ 10-2006-0018239

(51) Int. Cl.
   *H04B 7/185*  (2006.01)
   *H04M 1/00*  (2006.01)
(52) U.S. Cl. ..................................... 370/318; 455/550.1
(58) Field of Classification Search ............... 455/550.1, 455/90.3, 456.4, 575.1, 570–574; 370/318; 379/418, 207.16, 392, 392.01
See application file for complete search history.

(56) References Cited

U.S. PATENT DOCUMENTS

| | | | | |
|---|---|---|---|---|
| 7,084,701 B2 * | 8/2006 | Mendoza et al. | ................ | 330/51 |
| 7,444,160 B1 * | 10/2008 | Fournier et al. | ................ | 455/518 |
| 7,630,723 B2 * | 12/2009 | Vargas | ........................ | 455/456.4 |
| 7,755,692 B2 * | 7/2010 | Asada | ........................ | 348/333.01 |
| 2006/0056613 A1 * | 3/2006 | Kim et al. | ................. | 379/201.02 |
| 2006/0148530 A1 * | 7/2006 | Lim | .............................. | 455/566 |

* cited by examiner

*Primary Examiner* — Brandon Miller

(74) *Attorney, Agent, or Firm* — The Farrell Law Firm, P.C.

(57) ABSTRACT

Disclosed herein is a function for controlling sound output during power on. Upon the start of its booting-up process, a mobile communication terminal determines whether a key for entering the silent mode is pressed by the user. If the corresponding key is pressed, the mobile communication terminal changes a sector of a profile in which sound information is stored, so as to boot-up in the silent mode. Because the mobile communication terminal can change the current profile during the booting-up, the user can prevent the power-on sound from being generated during power on.

7 Claims, 3 Drawing Sheets

METHOD FOR ENTERING SILENT MODE AND MOBILE COMMUNICATION TERMINAL FOR THE SAME

PRIORITY

This application claims the benefit under 35 U.S.C. § 119 (a) of an application entitled "Method for Entering Silent Mode and Mobile Communication Terminal for the Same" filed in the Korean Intellectual Property Office on Feb. 24, 2006 and assigned Ser. No. 2006-18239, the entire contents of which are incorporated herein by reference.

BACKGROUND OF THE INVENTION

1. Field of the Invention

The present invention relates generally to a method for entering a silent mode and a mobile communication terminal for the same, and in particular, a method for enabling entry into a silent mode upon power on and a mobile communication terminal for the same.

2. Description of the Related Art

With the use of mobile communication terminals becoming more popular, various convenient user functions are being realized. In particular, as mobile communication terminals increasingly serve as an information processing apparatus that provide necessary information to the user regardless of time and place, various related functions are being added thereto. For example, mobile communication terminal users can exchange a variety of information with each other, to inquire after the other party's welfare or make important appointments.

Mobile communication terminals, which nowadays are one a necessity frequently used in everyday life, offer various user conveniences, but causes unexpected disadvantages as well. For example, the alerting tone of the mobile communication terminal, when generated in a public place, often causes the surrounding persons to feel uncomfortable. Further, the alerting tone of the mobile communication terminal, generated during a public performance or a concert, may cause the actors or musicians to lose their attention. As a solution to this problem, there is a method for switching an alerting mode of the mobile communication terminal to the silent mode.

Mobile communication terminals create other problems when powered on. For example, when turning on a mobile communication terminal that was powered off in a vibration mode, the mobile terminal will boot-up in a silent state. However, when turning on a mobile communication terminal that was powered off in a normal mode, the process of booting-up the mobile terminal will generate a Power-On sound. As a result, when the user intends to turn on the mobile communication terminal in a public place such as a lecture room or a conference room, the Power-On sound may be generated, because the user cannot control the sound generated during power-on.

The conventional mobile communication terminal cannot control the sound during power-on because a sector of a profile in which the sound information is stored by the terminal manufacturer is fixed, so the mobile communication terminal intactly reads the previously stored profile information.

SUMMARY OF THE INVENTION

To substantially solve at least the above problems and/or disadvantages and to provide at least the advantages below, the present invention provides a silent mode entering method for enabling entry into a silent mode upon power on regardless of the exiting profile information, and a mobile communication terminal for the same.

According to one aspect of the present invention, there is provided a method for entering a silent mode in a mobile communication terminal. The method includes steps of: determining whether there is a key input for entering the silent mode during booting; upon detecting the key input, changing a previously set profile; and entering the silent mode based on the changed profile.

According to another aspect of the present invention, there is provided a mobile communication terminal for entering a silent mode. The mobile communication terminal includes a keypad for detecting a key input for entering the silent mode; a memory for storing a preset profile; and a main processor for, upon receipt of a signal from the keypad during booting, changing the profile stored in the memory and entering the silent mode according to the changed profile.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Exemplary embodiments of the present invention will now be described in detail with reference to the annexed drawings. In the following description, a detailed description of known functions and configurations incorporated herein has been omitted for clarity and conciseness.

The present invention realizes a function for controlling the sound output during power on. To this end, when a mobile communication terminal begins the boot-up process, the present invention determines whether a key for entering a silent mode is pressed by the user. If the corresponding key is pressed, the present invention changes a sector of a profile in which sound information is stored, such that the mobile communication terminal can be booted in the silent mode. According to the present invention, the existing profile can be changed during the booting-up, process so the user can prevent the Power-On sound from being generated.

Figure 1:
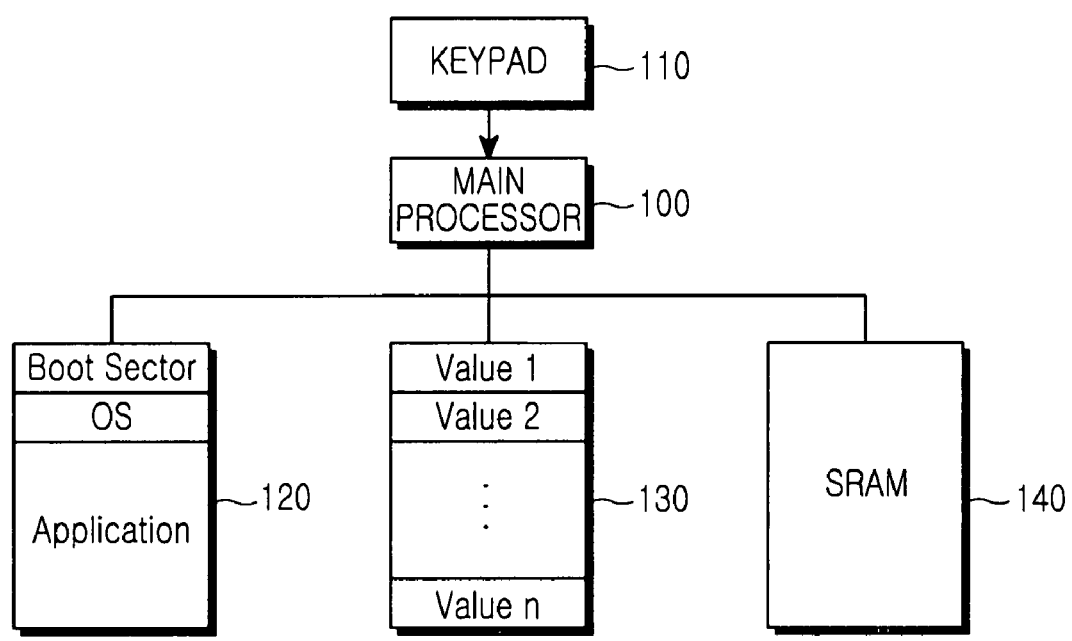
FIG. 1 is a block diagram illustrating an internal structure of a mobile communication terminal capable of entering a silent mode upon power on according to the present invention.

With reference to FIG. 1, a description will now be made of constituent elements and their operations of a mobile communication terminal in which the foregoing function is realized. FIG. 1 is a block diagram illustrating an internal structure of a mobile communication terminal capable of entering a silent mode upon power on according to the present invention.

Referring to FIG. 1, a main processor 100 performs the overall control operation of the mobile communication terminal, for example, performs wireless communication and data processing of the mobile communication terminal. According to an embodiment of the present invention, if there is a particular key input for entry into the silent mode during power on, the main processor 100 changes information in a profile, in which sound information is set, and performs the booting-up process in the silent mode depending on the changed profile information.

A keypad 110 has various keys, including alphanumeric keys, and provides key input data input by the user to the main processor 100. That is, the keypad 110 outputs unique key input data according to input of each key prepared thereon, and the key input data output from the keypad 110 is applied to the main processor 100 to determine, based on which key input, the key input data is generated. Based on the determination result, the main processor 100 performs a corresponding operation. In addition, keypad 110 preferably includes a silent mode switch key, and the silent mode switch key can be separately mounted on the keypad 110, or can be realized by an existing function key for performing another function. Alternatively, the silent mode switch key can be realized by a previously mapped key combination.

Meanwhile, the main processor 100 controls data input/output of each memory, and each memory includes flash memories 120 and 130, and a static random access memory (SRAM) 140. The flash memories 120 and 130 store therein Boot Sector, Operation System (OS), various applications, and various parameter values of Value 1, Value 2, . . . , Value n. The SRAM 140 stores transmission/reception data therein.

The Boot Sector of the flash memory cannot be changed without permission because the information used for loading the Operation System is stored therein. The SRAM 140 functions as a buffer for temporarily storing the data or message received from a mobile communication network during an operation of the mobile communication terminal, and the data or message processed by the main processor 100 is deleted from the SRAM 140.

In the process of changing a profile in the memory, if there is a particular key input during the power on process, the main processor 100 first designates a sector position of the profile to be changed, and then changes information on the sector position, thereby changing the profile information.

Figure 2:
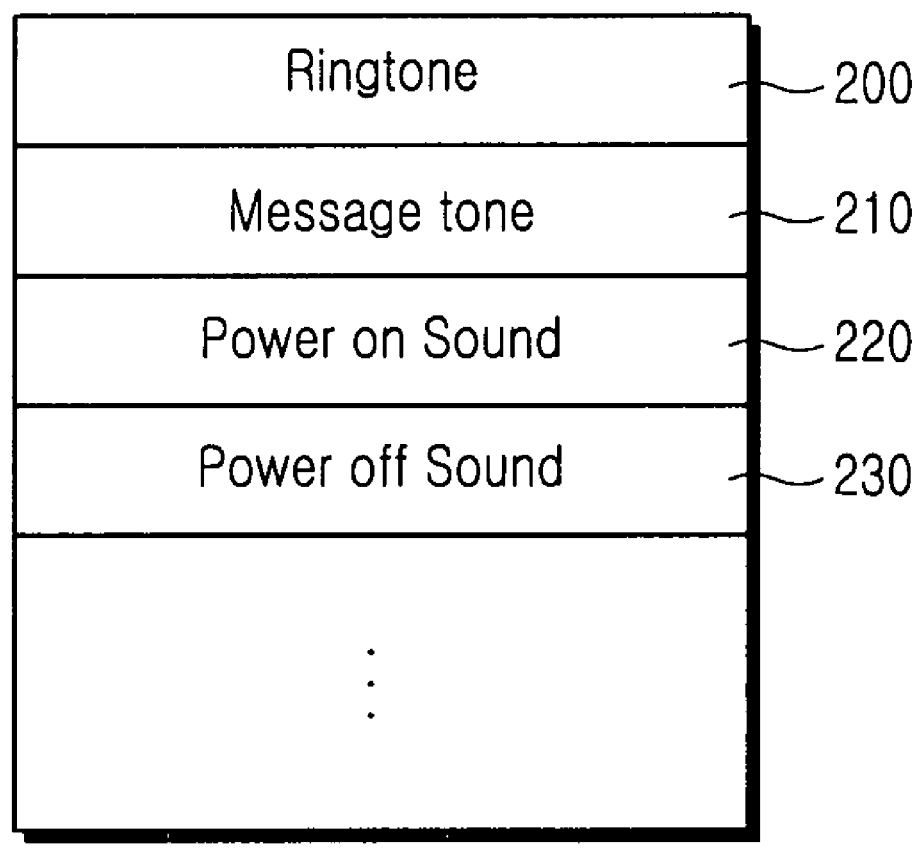
FIG. 2 is a diagram illustrating a structure of a profile according to the present invention.

Specifically, the memory unit in which the profile is stored according to an embodiment of the present invention can include the flash memory 130. The flash memory 130, as shown in FIG. 2, stores therein a profile formed of sectors in which various types of additional function information is stored. FIG. 2 is a diagram illustrating an exemplary structure of a profile according to the present invention. The sector is formed of a plurality of unit areas having a predetermined memory capacity, and each of the unit areas can store therein different additional function information. Herein, the term "profile" refers to a list in which various functions are set according to preference of the user in order to perform various additional functions, and includes such sectors of Ringtone 200, Message Tone 210, Power-On Sound 220, and Power-Off Sound 230.

For example, when the normal mode is set by the user, a status flag value of the Power-On Sound sector 220 is set to 'ON' in order to output the sound during power on. On the contrary, if the silent mode is set, the status flag value of the Power-On Sound sector 220 is set to 'OFF' and instead, the Power-Off Sound sector 230 can be set to 'ON'. Based on the information of each sector, an operation mode of the mobile communication terminal can be set to one of, for example, Normal, Silent and Car modes.

Specifically, the user can set the operation mode through a main menu realized in the mobile communication terminal, and adjust various sounds such as the bell sound and the message tone according to his/her preference. In response to the user's decision, the main processor 100 can set information of each of the sound sectors to 'ON' or 'OFF' according to the menu selection of the user. That is, the user can turn on/off various sounds. Although the status flag values of the Power-On Sound sector 220 and the Power-Off Sound sector 230 are changed herein to adjust the sounds, by way of example, various changes in the sector structure and the information set in each sector can be made.

The change in the setting information of the profile can be made only when the mobile communication is powered on, i.e., when the user can check the menu. However, the present invention provides a method capable of changing the set profile even when the mobile communication terminal is not powered on. In particular, the present invention provides a method capable of entering the silent mode regardless of the set mode, when the mobile communication terminal in the power-off state is turned on.

Figure 3:
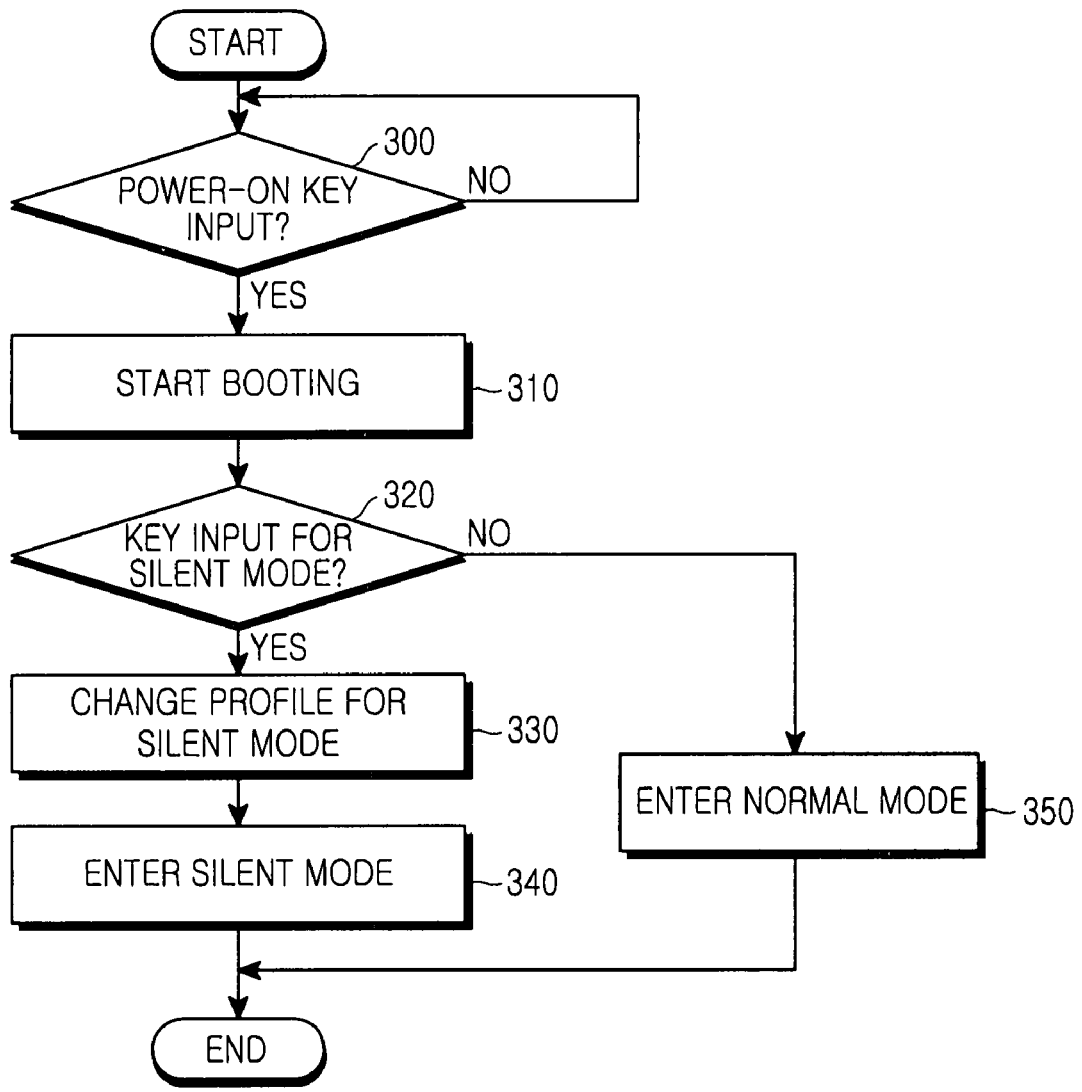
FIG. 3 is a diagram illustrating a procedure for entering the silent mode during the booting-up process according to the present invention.

With reference to FIG. 3, a description will now be made of a procedure for entering the silent mode during the booting-up process according to the present invention.

Referring to FIG. 3, in order to turn on the mobile communication terminal in the power-off state, the user will generally continuously press a predefined key such as an End key. Therefore, the main processor 100 determines in step 300 whether there is a power-on key input from the user. If there is a power-on key input, the main processor 100 starts the booting-up process in step 310. While performing the booting, the main processor 100 determines in step 320 whether there is a key input for the silent mode. That is, the user can input a particular key in order to enter the silent mode during the booting. If it is determined that there is the key input for the silent mode, the main processor 100 changes a profile for the silent mode in step 330. For example, the main processor 100 can set a status flag value of a Power-On Sound sector 220 among the sectors constituting the profile to 'OFF', and instead, set a status flag value of a Power-Off Sound sector 230 to 'ON'. Thereafter, in step 340, the main processor 100 reads the changed profile and enters the silent mode based on the read profile. As a result, the Power-On sound generated during the booting-up process is turned off. Otherwise, if it is determined in step 320 that there is no key input for the silent mode during the booting, the main processor 100 enters the normal mode in step 350.

Through the foregoing process, the user can prevent the Power-On sound from being generated by changing the operation mode to the silent mode during power-on if necessary, without checking the current mode set in the mobile communication terminal.

As can be understood from the foregoing description, the user can prevent the Power-On sound from being generated even though he/she is unaware of the type of the current mode in the situation where the user should power-on the mobile communication terminal during conference or lecture.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for entering a silent mode in a mobile communication terminal, the method comprising: determining whether there is a key input for entering the silent mode during a booting-up process; upon detecting the key input, changing a profile in which sound information is set into a profile corresponding to the silent mode; and entering the silent mode based on the changed profile, wherein entering the silent mode prevents playing of a power-on sound without accessing a user menu of the mobile communication terminal, and wherein changing the profile includes setting a power-off sound sector in the profile to 'on' and setting a power-on sound sector in the profile to 'off'.

2. The method of claim 1, wherein a user is only permitted to individually change sectors of sound setting information within the profile through checking the user menu of the mobile communication terminal.

3. The method of claim 1, wherein the profile includes sectors corresponding to a ringtone, a message tone, the power-on sound, and the power-off sound sector.

4. A mobile communication terminal for entering a silent mode, comprising: a keypad for detecting a key input for entering the silent mode; a memory for storing a preset profile in which sound information is set; and a main processor for, upon receipt of a signal from the keypad during a booting-up process, changing the profile stored in the memory into a profile corresponding to the silent mode and entering the silent mode according to the changed profile, wherein entering the silent mode prevents playing of a power-on sound without accessing a menu of the mobile communication terminal, wherein the changing the profile includes setting a power-off sound sector in the profile to 'on' and setting a power-on sound sector in the profile to 'off'.

5. The mobile communication terminal of claim 4, wherein the memory includes a flash memory that stores sound sector information.

6. The mobile communication terminal of claim 4, wherein a user is only permitted to individually change sectors of sound setting information within the profile through checking the menu of the mobile communication terminal.

7. The mobile communication terminal of claim 4, wherein the profile includes sectors corresponding to a ringtone, a message tone, the power-on sound, and the power-off sound sector.

* * * * *